United States Patent
Nakano

(10) Patent No.: US 9,631,574 B2
(45) Date of Patent: Apr. 25, 2017

(54) FUEL INJECTION CONTROL DEVICE FOR INTERNAL COMBUSTION ENGINE

(75) Inventor: Tomohiro Nakano, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 222 days.

(21) Appl. No.: 14/353,114

(22) PCT Filed: Oct. 26, 2011

(86) PCT No.: PCT/JP2011/074700
§ 371 (c)(1),
(2), (4) Date: Apr. 21, 2014

(87) PCT Pub. No.: WO2013/061425
PCT Pub. Date: May 2, 2013

(65) Prior Publication Data
US 2014/0244137 A1    Aug. 28, 2014

(51) Int. Cl.
*F02D 41/00*    (2006.01)
*F02D 41/32*    (2006.01)
(Continued)

(52) U.S. Cl.
CPC ......... *F02D 41/32* (2013.01); *F02D 41/3094* (2013.01); *F02D 41/34* (2013.01);
(Continued)

(58) Field of Classification Search
CPC ...... F02D 41/30; F02D 41/3094; F02D 41/34; F02D 41/40; F02D 37/02; F02D 41/3029;
(Continued)

(56) References Cited

U.S. PATENT DOCUMENTS 5,875,743 A * 3/1999 Dickey .............. F02B 1/12
                                                    123/25 C
5,970,950 A * 10/1999 Shimizu .......... F02D 41/2422
                                                    123/295
(Continued)

FOREIGN PATENT DOCUMENTS

DE    102 42 226 A1    3/2004
JP    11-082097        3/1999
(Continued)

OTHER PUBLICATIONS

International Search Report issued Jan. 24, 2011, in PCT/JP2011/074700, filed Oct. 26, 2011.
(Continued)

*Primary Examiner* — Thomas Moulis
*Assistant Examiner* — Susan E Scharpf
(74) *Attorney, Agent, or Firm* — Oblon, McClelland, Maier & Neustadt, L.L.P.

(57) ABSTRACT

When injecting fuel from a direct injector and a port injector such that a requested fuel injection amount is obtained in an internal combustion engine, the direct injector is driven in the following manner. After a target fuel injection amount for the fuel injection with the higher priority among fuel injection in the late stage of a compression stroke and fuel injection in the early stage of an intake stroke in the direct injector has been set on the basis of the engine operating condition, the target fuel injection amount for the fuel injection with the lower priority is set on the basis of the engine operating condition. Moreover, the direct injector is driven in such a manner that the target fuel injection amount for each of the abovementioned fuel injections set in this manner is obtained.

6 Claims, 10 Drawing Sheets

(51) Int. Cl.
*F02D 41/34* (2006.01)
*F02D 41/30* (2006.01)
*F02D 41/40* (2006.01)
*F02D 37/02* (2006.01)

(52) U.S. Cl.
CPC .............. *F02D 41/40* (2013.01); *F02D 37/02* (2013.01); *Y02T 10/44* (2013.01)

(58) Field of Classification Search
CPC ........ F02D 41/32; F02P 5/1502; Y02T 10/44; Y02T 10/46
USPC .................. 123/478, 299–305; 701/103, 104
See application file for complete search history.

(56) References Cited

U.S. PATENT DOCUMENTS

| | | | | |
|---|---|---|---|---|
| 6,044,642 A * | 4/2000 | Nishimura | ............ | F02D 41/024 123/295 |
| 6,269,634 B1 * | 8/2001 | Yokota | .................. | F01N 3/0842 123/300 |
| 6,314,940 B1 * | 11/2001 | Frey | ....................... | F02B 23/101 123/430 |
| 6,318,074 B1 * | 11/2001 | Nishimura | ............ | F02D 41/024 60/284 |
| 6,330,796 B1 * | 12/2001 | Nishimura | ............ | F02D 41/024 123/295 |
| 6,345,499 B1 * | 2/2002 | Nishimura | ............... | F02D 37/02 123/295 |
| 6,557,532 B1 * | 5/2003 | Nakayama | ............ | F02B 17/005 123/299 |
| 7,159,568 B1 * | 1/2007 | Lewis | ................... | F02D 19/084 123/299 |
| 7,370,629 B2 * | 5/2008 | Kohler | ................... | F02B 23/101 123/295 |
| 7,467,617 B2 * | 12/2008 | Irisawa | ................. | F02D 41/008 123/295 |
| 7,681,554 B2 * | 3/2010 | Stein | ....................... | F02D 19/12 123/198 A |
| 7,740,009 B2 * | 6/2010 | Shelby | .................. | F02D 19/084 123/304 |
| 8,165,788 B2 * | 4/2012 | Surnilla | .............. | F02D 41/0025 123/406.11 |
| 2005/0172931 A1 * | 8/2005 | Mori | ................... | F02D 41/3094 123/305 |
| 2005/0199218 A1 * | 9/2005 | Hashima | ............. | F02D 41/3029 123/431 |
| 2005/0235959 A1 * | 10/2005 | Sadakane | .................. | F02B 7/02 123/431 |
| 2006/0124104 A1 | 6/2006 | Altenschmidt | | |
| 2006/0144365 A1 | 7/2006 | Miyashita | | |
| 2007/0215102 A1 * | 9/2007 | Russell | ............... | F02D 41/0025 123/310 |
| 2007/0215111 A1 * | 9/2007 | Surnilla | ................ | F02D 19/088 123/431 |
| 2009/0099756 A1 | 4/2009 | Demura | | |
| 2009/0177364 A1 | 7/2009 | Hattori | | |
| 2009/0308367 A1 * | 12/2009 | Glugla | .................. | F02D 19/081 123/575 |
| 2010/0312455 A1 | 12/2010 | Yamashita et al. | | |

FOREIGN PATENT DOCUMENTS

| | | |
|---|---|---|
| JP | 2000-45840 A | 2/2000 |
| JP | 2001-098971 | 4/2001 |
| JP | 2003-193894 | 7/2003 |
| JP | 2003-269220 | 9/2003 |
| JP | 2005-061265 | 3/2005 |
| JP | 2005-194965 | 7/2005 |
| JP | 2006-194098 | 7/2006 |
| JP | 2009-013818 | 1/2009 |
| JP | 2009-191663 | 8/2009 |
| JP | 2010-281235 | 12/2010 |

OTHER PUBLICATIONS

Office Action issued on Sep. 19, 2016 in German Patent Application No. 11 2011 105 782.2 (with English translation).

* cited by examiner

FUEL INJECTION CONTROL DEVICE FOR INTERNAL COMBUSTION ENGINE

TECHNICAL FIELD

The present invention relates to a fuel injection control device for an internal combustion engine.

As an internal combustion engine for a vehicle including an automobile, a type having a direct injector for injecting fuel into a cylinder and a port injector for injecting fuel into an intake port is known. In such an internal combustion engine, fuel is injected by at least one of the direct injector and the port injector such that a requested fuel injection amount determined based on the engine operating state is achieved. If the direct injector is activated at this time, the direct injector injects an amount of fuel that corresponds to at least some of the requested fuel injection amount is injected by the activation.

Patent Document 1 discloses an internal combustion engine having a direct injector and a port injector. In the disclosed configuration, if the fuel injection amount exceeds the upper limit of a range in which smoke is suppressed when the direct injector injects fuel, the amount of fuel corresponding to the excess over the upper limit is injected by the port injector. Patent Document 2 discloses that, when fuel is injected by a direct injector, the fuel injection is carried out in a divided manner in a shot corresponding to the early stage of the intake stroke and a shot corresponding to the compression stroke. In these cases, the amount of fuel to be injected from the direct injector (a target fuel injection amount) is divided into target fuel injection amounts for respective fuel injection shots in correspondence with a predetermined ratio. The direct injector is then activated such that the respective target fuel injection amounts are achieved.

Specifically, the fuel injection in the compression stroke and the fuel injection in the early stage of the intake stroke bring about desirable engine operation, as will be described in the items [1] and [2] below. [1] The fuel injection in the compression stroke is characterized in that air streams in a cylinder are easily collected near an ignition plug and thus achieves desirable ignition of the fuel in the cylinder to increase the fuel combustion speed. [2] The fuel injection in the early stage of the intake stroke allows the injected fuel to adhere directly to the piston top and thus cools the piston top using latent heat of vaporization produced by the fuel and suppresses the occurrence of knocking in the engine.

PRIOR ART DOCUMENTS

Patent Documents

Patent Document 1: Japanese Laid-Open Patent Publication No. 2005-194965 (paragraph [0015])
Patent Document 2: Japanese Laid-Open Patent Publication No. 2006-194098 (paragraphs [0080] to [0086])

To achieve desirable engine operation in an internal combustion engine having a direct injector, it is preferable to perform the fuel injection from the direct injector in the shot corresponding to the compression stroke and the shot corresponding to the early stage of the intake stroke to bring about the above-described advantages [1] and [2] to a maximum extent. For this purpose, the fuel injection amounts (the target fuel injection amounts) in the respective shots of fuel injection must be adjusted to requested values necessary for achieving the advantages [1] and [2] in the current engine operating state.

However, when the fuel injection in the shots corresponding to the compression stroke and the early stage of the intake stroke are carried out by dividing the fuel injection from the direct injector into multiple shots in the manner described in Patent Document 2, it is difficult to set the target fuel injection amounts in the respective fuel injection shots to the values (the requested values) necessary for obtaining the corresponding advantages [1] and [2].

Specifically, the target fuel injection amounts in the respective fuel injection shots are set by dividing the target fuel injection amount for the full amount of the fuel injected from the direct injector by a predetermined ratio. Accordingly, in this case, to obtain desired one of the advantages [1] and [2], the ratio must be set such that the target fuel injection amount in the fuel injection shot associated with the desired advantage becomes the value (the requested value) necessary for achieving the desired advantage. However, if the target fuel injection amount in the other fuel injection shot is determined using the thus set ratio, the fuel injection in the other shot, which is performed to achieve the target fuel injection amount, may not be capable of achieving the associated advantage [1] or [2] that is different from the desired advantage. Specifically, the target fuel injection amounts in the respective fuel injection shots necessary for achieving the associated advantages [1] and [2] vary in mutually different manners in correspondence with the engine operating state. Accordingly, when the target fuel injection amounts in the fuel injection shots are set in the above-described manner, it is highly likely that one of the target fuel injection amounts cannot achieve the associated advantage, which is the advantage different from the desired one. In other words, the advantage other than the desired advantage cannot necessarily be obtained.

Accordingly, if the target fuel injection amounts in the respective fuel injection shots are set by dividing the target fuel injection amount for the full amount of the fuel injected from the direct injector by the above-described ratio, it is difficult to set the target fuel injection amounts to the values (the requested values) necessary for obtaining the corresponding advantages [1] and [2]. This makes it difficult to obtain both of the advantages [1] and [2], thus hampering maximum-performance operation of the internal combustion engine.

Accordingly, it is an objective of the present invention to provide a fuel injection control device for an internal combustion engine capable of achieving maximum engine performance by adjusting the amount of fuel injected from a direct injector to an adequate value.

Means for Solving the Problems

To achieve the foregoing objective and in accordance with one aspect of the present invention, a fuel injection control device for an internal combustion engine is provided that has a direct injector capable of injecting fuel into a cylinder of the engine in a compression stroke and an early stage of an intake stroke of the engine. The fuel injection control device performs fuel injection from the direct injector to supply at least some of a requested fuel injection amount determined based on an engine operating state. The control device sets a target fuel injection amount of the fuel injection from the direct injector in the compression stroke to a requested value corresponding to the engine operating state. The control device performs fuel injection from the direct injector in the compression stroke by the target fuel injection amount and operates the direct injector to inject, in the early stage of the intake stroke, an amount of fuel that corresponds to a part of the requested fuel injection amount that cannot be injected by the fuel injection from the direct injector in the compression stroke.

Between the fuel injection from the direct injector in the shot of the compression stroke and the shot of the early stage of the intake stroke, the fuel injection in a shot closer to the ignition timing is given higher priority. Specifically, the fuel injection in the shot closer to the ignition timing has greater influence on fuel ignition caused by variation in the fuel injection amount and is thus given the higher priority. For the same reason, the fuel injection in the shot of the early stage of the intake stroke, which is less close to the ignition timing, is given the lowest priority.

As a result, as has been described, the target fuel injection amount of the fuel injection from the direct injector in the compression stroke is set to the requested value corresponding to the engine operating state with high priority over the target fuel injection amount of the fuel injection from the direct injector in the early stage of the intake stroke. The target fuel injection amount of the fuel injection from the direct injector in the shot having the high priority, which is the shot in the compression stroke, is thus set, based on the engine operating state, to the value (the requested value) that maximizes the advantages of the fuel injection in the shot. Fuel injection from the direct injector is performed through a shot of the target fuel injection amount in the compression stroke. Further, the direct injector injects, through another shot, an amount of fuel that corresponds to a part of the requested fuel injection amount that cannot be injected by the fuel injection in the compression stroke. As a result, the advantages of the fuel injection in both shots are ensured to a maximum extent. This achieves the advantages of the fuel injection in all shots of the fuel injection to a maximum extent to obtain maximum engine performance.

The fuel injection from the direct injector in the shot with a higher priority than the shot in the early stage of the intake stroke, which is the shot in the compression stroke, has the characteristics described below. Specifically, the fuel injection in the compression stroke improves the fuel injection speed in the cylinder but may adversely affect the fuel combustion if the fuel injection amount increases beyond the corresponding target fuel injection amount.

Accordingly, as has been described, an amount of fuel that corresponds to a part of the requested fuel injection amount that cannot be injected by the fuel injection in the compression stroke is injected by the fuel injection in the early stage of the intake stroke, which is given lower priority than the fuel injection in the compression stroke. This makes it unlikely that the fuel injection amount of the fuel injection in the compression stroke will increase beyond the target fuel injection amount to supply the requested fuel injection amount and thus adversely affect the fuel combustion. Also, since the fuel injection amount of the fuel injection in the compression stroke becomes equal to the target fuel injection amount, the fuel combustion speed in the cylinder is increased through such fuel injection.

Another form of the present invention includes a direct injector capable of injecting fuel into a cylinder of an internal combustion engine in the compression stroke and the early stage of the intake stroke of the engine and a port injector capable of injecting fuel into an intake port of the engine. The direct injector and the port injector are operated in the manner described below, when fuel is injected from the direct injector and the port injector to supply a requested fuel injection amount, which is determined based on the engine operating state.

That is, of the target fuel injection amounts of fuel injection from the direct injector in the compression stroke and the early stage of the intake stroke, the target fuel injection amount of the fuel injection with a higher priority is set as a requested value corresponding to the engine operating state. Then, the target fuel injection amount of the fuel injection with the lower priority is set as a requested value corresponding to the engine operating state. The direct injector is then actuated (to perform the fuel injection) in the compression stroke and the late stage of the intake stroke based on the corresponding target fuel injection amounts to achieve the target fuel injection amounts of the respective fuel injection shots.

However, there may be a case in which the sum of the target fuel injection amounts of the fuel injection from the direct injector in the compression stroke and the early stage of the intake stroke falls short of the requested fuel injection amount. In this case, the fuel of the requested fuel injection amount cannot be fully injected by the fuel injection from the direct injector in the compression stroke and the early stage of the intake stroke. To solve this problem, an amount of fuel that corresponds to a part of the requested fuel injection amount that cannot be injected by the fuel injection from the direct injector in the above-described shots is set as the target fuel injection amount of the fuel injection from the port injector. The port injector is thus operated based on the set target fuel injection amount to achieve the target fuel injection amount.

In this case, the target fuel injection amounts of the fuel injection from the direct injector in the above-described shots are set based on the engine operating state to the values that maximize the advantages of the fuel injection in the respective shots, sequentially in the descending order according to the priority ranking given to the shots in the current engine operating state. The direct injector is then operated to achieve the target fuel injection amounts of the respective shots of fuel injection. This achieves the advantages of the fuel injection in all shots of the fuel injection to a maximum extent to obtain maximum engine performance.

The fuel injection from the direct injector in the compression stroke improves the fuel injection speed in the cylinder. However, such fuel injection may adversely affect the fuel combustion if the fuel injection amount increases beyond the corresponding target fuel injection amount. The fuel injection from the direct injector in the early stage of the intake stroke cools the piston top using latent heat of vaporization produced by injected fuel to cool the temperature in the cylinder and suppress the occurrence of knocking. However, such fuel injection may adversely affect the fuel combustion if the fuel injection amount increases beyond the corresponding target fuel injection amount.

To avoid these problems, an amount of fuel that corresponds to a part of the requested fuel injection amount that cannot be injected by the fuel injection from the direct injector in the compression stroke and the early stage of the intake stroke is injected by the fuel injection from the port injector. This makes it unlikely that the fuel injection amount of the fuel injection in the compression stroke or the early stage of the intake stroke will increase beyond the corresponding target fuel injection amount to supply the requested fuel injection amount and thus adversely affect the fuel combustion. Also, since the fuel injection amount of the fuel injection in the compression stroke becomes equal to the target fuel injection amount, the fuel combustion speed in the cylinder is increased through such fuel injection. Additionally, since the fuel injection amount of the fuel injection in the early stage of the intake stroke becomes equal to the corresponding target fuel injection amount, the piston top is cooled appropriately through such fuel injection, and the occurrence of knocking is suppressed through such cooling.

Another form of the present invention operates a direct injector, which is capable of injecting fuel into a cylinder of an internal combustion engine to supply at least some of a requested fuel injection amount determined based on the engine operating state, in the manner described below to inject fuel from the direct injector. That is, of the target fuel injection amounts of fuel injection from the direct injector in the compression stroke and the early stage of the intake stroke, the target fuel injection amount of the fuel injection with a higher priority is set as a requested value corresponding to the engine operating state. Then, the target fuel injection amount of the fuel injection with the lower priority is set as a requested value corresponding to the engine operating state. The direct injector is then operated based on the target fuel injection amounts of the respective shots of the fuel injection to achieve the target fuel injection amounts.

In this case, the target fuel injection amounts of the fuel injection from the direct injector in the above-described shots are set based on the engine operating state to the values (the requested values) that maximize the advantages of the fuel injection in the respective shots, sequentially in the descending order according to the priority ranking given to the shots in the current engine operating state. The direct injector is then operated to achieve the target fuel injection amounts of the respective shots of fuel injection. This achieves the advantages of the fuel injection in all shots of the fuel injection to a maximum extent to obtain maximum engine performance.

Another form of the invention sets the target fuel injection amount of the fuel injection from the direct injector in the early stage of the stroke to a greater value as the engine load becomes greater. Specifically, the fuel injection in the early stage of the intake stroke cools the piston top using latent heat of vaporization produced by injected fuel and thus suppresses the occurrence of knocking in the engine through such cooling. The internal combustion engine has such an ignition timing that maximizes output torque (MBT). It is thus desirable that the ignition timing be advanced to the MBT without causing knocking. However, the temperature in the cylinder becomes higher and may induce knocking as the engine load becomes greater. The ignition timing of the engine thus must be retarded with respect to the MBT not to cause an excessive rise of the temperature in the cylinder. Such retardation of the ignition timing hampers increase in the output torque of the engine. However, by setting the target fuel injection amount in the early stage of the intake stroke to a greater value as the engine load becomes greater, as has been described, such fuel injection cools the piston top more effectively as the engine load becomes greater. A temperature rise in the cylinder thus becomes unlikely to occur and the knocking also becomes unlikely to happen. This allows advancement of the ignition timing of the engine toward the MBT, thus increasing the output torque of the engine through such ignition timing advancement.

MODES FOR CARRYING OUT THE INVENTION

One embodiment of a fuel injection control device for an internal combustion engine mounted in a vehicle according to the present invention will now be described with reference to FIGS. 1 to 13.

Figure 1:
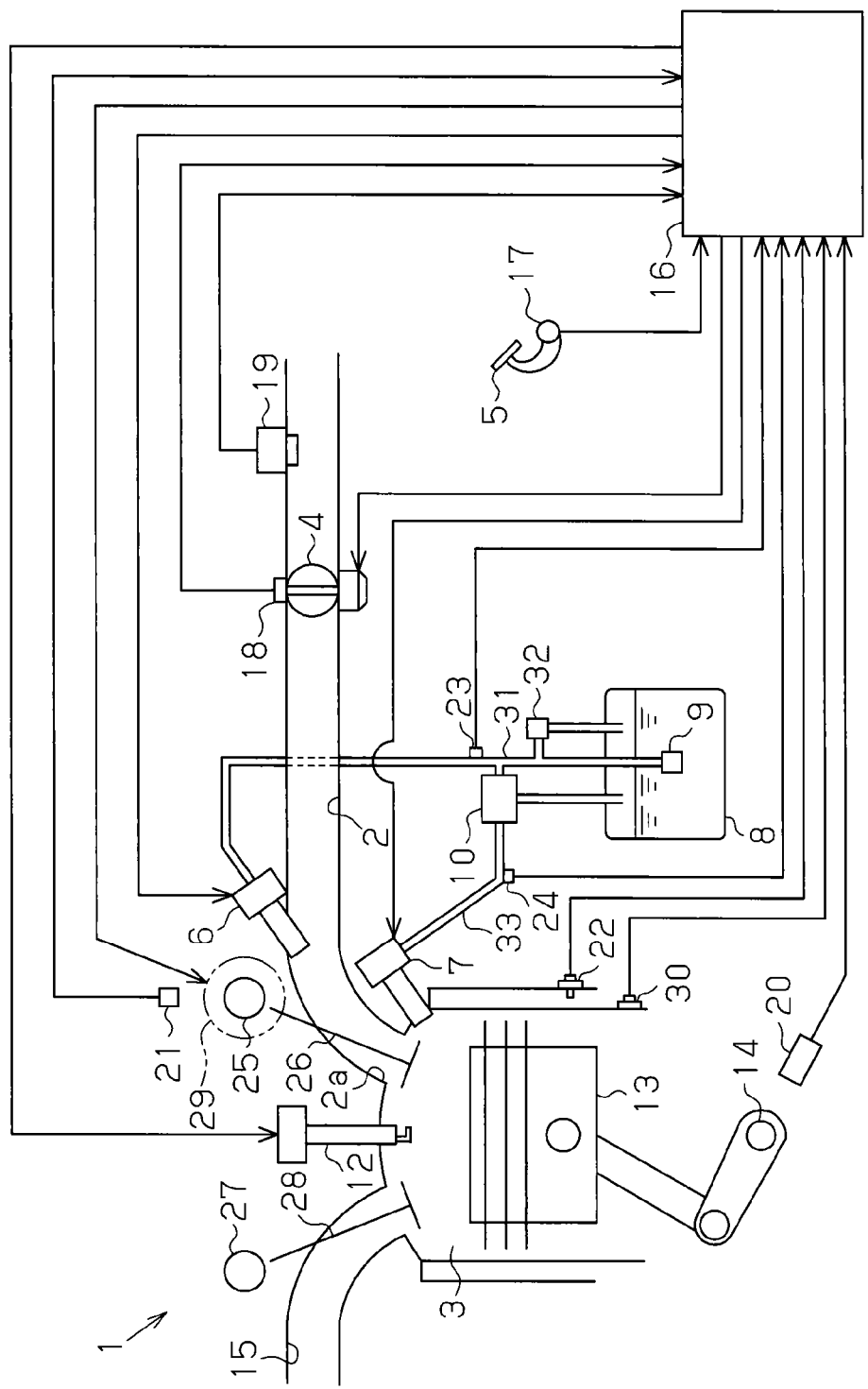
FIG. 1 is a diagram schematically showing an internal combustion engine as a whole employing a fuel injection control device according to one embodiment of the present invention.

As shown in FIG. 1, a throttle valve 4 is arranged in an intake passage 2 of an internal combustion engine 1 and selectively opens and closes to adjust the amount of air drawn into a combustion chamber 3 (the intake air amount). The opening degree of the throttle valve 4 (the throttle opening degree) is adjusted in correspondence with the operating amount of an accelerator pedal 5 (the accelerator operating amount), which is depressed by the driver of the vehicle. The engine 1 has a port injector 6, which injects fuel from the intake passage 2 into an intake port 2a of the combustion chamber 3, and a direct injector 7, which injects fuel into the combustion chamber 3 (into a cylinder). The fuel is supplied to the injectors 6, 7 from a fuel tank 8.

Specifically, the fuel in the fuel tank 8 is drawn by a feed pump 9 and then delivered to the port injector 6 via a low-pressure fuel pipe 31. The fuel pressure in the low-pressure fuel pipe 31 is adjusted to the feed pressure through operation control performed on the feed pump 9 and prevented from excessively increasing by a pressure regulator 32, which is formed in the low-pressure fuel pipe 31. Some of the fuel in the low-pressure fuel pipe 31, which has been drawn by the feed pump 9, is pressurized by a high-pressure fuel pump 10 to a value higher than the feed pressure (hereinafter, referred to as the direct injection pressure) and then supplied to the direct injector 7 via a high-pressure fuel pipe 33.

In the engine 1, air-fuel mixture is formed by the fuel injected from the injectors 6, 7 and the air flowing in the intake passage 2 and received in the combustion chamber 3. The air-fuel mixture is then ignited by a spark plug 12. The air-fuel mixture thus burns and produces combustion energy, which reciprocates a piston 13 to rotate a crankshaft 14. The burned air-fuel mixture is discharged to an exhaust passage 15 as exhaust gas. An intake valve 26 selectively opens and closes through rotation of an intake camshaft 25, to which rotation of the crankshaft 14 is transmitted, to permit or block communication between the combustion chamber 3 and the intake passage 2. An exhaust valve 28 selectively opens and closes through rotation of an exhaust camshaft 27, to which rotation of the crankshaft 14 is transmitted, to permit or block communication between the combustion chamber 3 and the exhaust passage 15.

The engine 1 has a variable valve timing mechanism 29 as a variable valve actuation mechanism for varying the characteristics of opening and closing of the intake valve 26. The variable valve timing mechanism 29 changes the rotation phase of the intake camshaft 25 relative to the rotation phase of the crankshaft 14 (the valve timing of the intake valve 26). The variable valve timing mechanism 29 is actuated to advance or retard both the opening timing and the closing timing of the intake valve 26 with the opening period (the actuation angle) of the intake valve 26 maintained constant.

The electric configuration of the fuel injection control device of the first embodiment will hereafter be described.

The fuel injection control device includes an electronic control unit 16, which carries out various types of operation control of the engine 1. The electronic control unit 16 has a CPU for executing various calculation procedures related to the operation control, a ROM for storing programs and data necessary for the control, a RAM for temporarily memorizing calculation results from the CPU, and input and output ports for inputting and outputting signals from and to the exterior.

Various sensors including the sensors described below are connected to the input port of the electronic control unit 16.

An accelerator position sensor 17 detects the accelerator operation amount.

A throttle position sensor 18 detects the throttle opening degree.

An air flow meter 19 detects the amount of the air passing through the intake passage 2 (the intake air amount of the engine 1).

A crank position sensor 20 outputs signals corresponding to rotation of the crankshaft 14.

A cam position sensor 21 outputs signals corresponding to the rotational position of the intake camshaft 25 based on rotation of the intake camshaft 25.

A coolant temperature sensor 22 detects the temperature of the coolant in the engine 1.

A first pressure sensor 23 detects the fuel pressure in the low-pressure fuel pipe 31 (the feed pressure).

A second pressure sensor 24 detects the fuel pressure in the high-pressure fuel pipe 33 (the direct injection pressure).

A knock sensor 30 detects knocking in the engine 1.

Drive circuits for various devices, including the throttle valve 4, the port injector 6, the direct injector 7, the spark plug 12, and the variable valve timing mechanism 29, are connected to the output port of the electronic control unit 16.

Based on signals received from the above-described sensors, the electronic control unit 16 determines the engine operating state including the engine speed and the engine load. The electronic control unit 16 then provides command signals to drive circuits for various devices, including the throttle valve 4, the injectors 6, 7, the feed pump 9, the spark plug 12, and the variable valve timing mechanism 29, based on the engine operating state. In this manner, the various types of operation control of the engine 1, such as throttle opening degree control, fuel injection control, and ignition timing control for the engine 1 and valve timing control for the intake valve 26, are carried out through the electronic control unit 16. When performing the fuel injection control, the electronic control unit 16 functions as a drive section for driving the port injector 6 and the direct injector 7.

Specifically, the aforementioned engine speed is determined using a detection signal from the crank position sensor 20. The engine load is calculated using a parameter corresponding to the intake air amount of the engine 1 and the engine speed. The parameter corresponding to the intake air amount may be an actual measurement of the intake air amount of the engine 1 determined using a detection signal from the air flow meter 19, the throttle opening degree obtained from a detection signal from the throttle position sensor 18, or the accelerator operation amount determined using a detection signal from the accelerator position sensor 17.

Fuel injection amount control is performed as part of the fuel injection control of the engine 1 by determining a requested fuel injection amount Qfin for the engine 1 as a whole based on the engine operating state including the engine speed and the engine load and then operating the port injector 6 and the direct injector 7 to inject fuel such that the requested fuel injection amount Qfin is achieved. Specifically, in this control, the direct injector 7 is actuated to ensure fuel injection of at least some of the amount corresponding to requested fuel injection amount Qfin.

Figure 2:
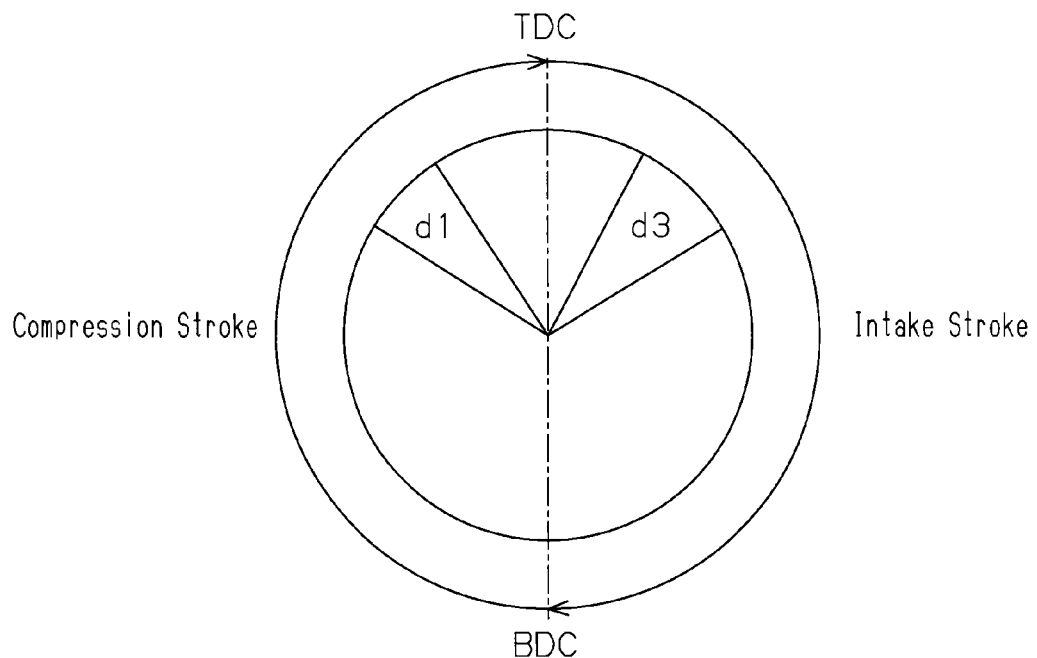
FIG. 2 is an explanatory diagram illustrating a mode of fuel injection from a direct injector.

The fuel injection from the direct injector 7 may include shots of fuel injection in the compression stroke and the early stage of the intake stroke of the engine 1. FIG. 2 illustrates fuel injection periods corresponding to the fuel injection shots by way of example. A compression fuel injection period d1 represents the fuel injection shot in the compression stroke, and an intake fuel injection period d3 represents the fuel injection shot in the early stage of the intake stroke. The compression fuel injection period d1 and the intake fuel injection period d3 have respective maximum values for the purpose of reliably achieving the advantages of the fuel injection during these periods. As has been described in the BACKGROUND ART section, the fuel injection shots of the direct injector 7 in the compression stroke and the early stage of the intake stroke bring about desired engine operation described in the items [1] and [2], respectively, as will be described below.

Figure 3:
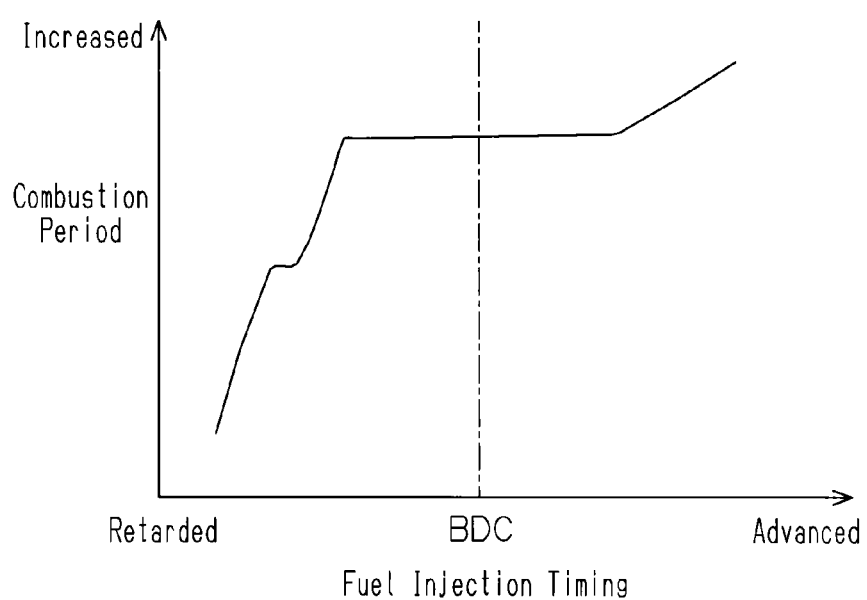
FIG. 3 is a graph representing the relationship between the fuel injection timing and the fuel combustion period in the cylinder in the fuel injection from the direct injector in the compression stroke.
Figure 4:
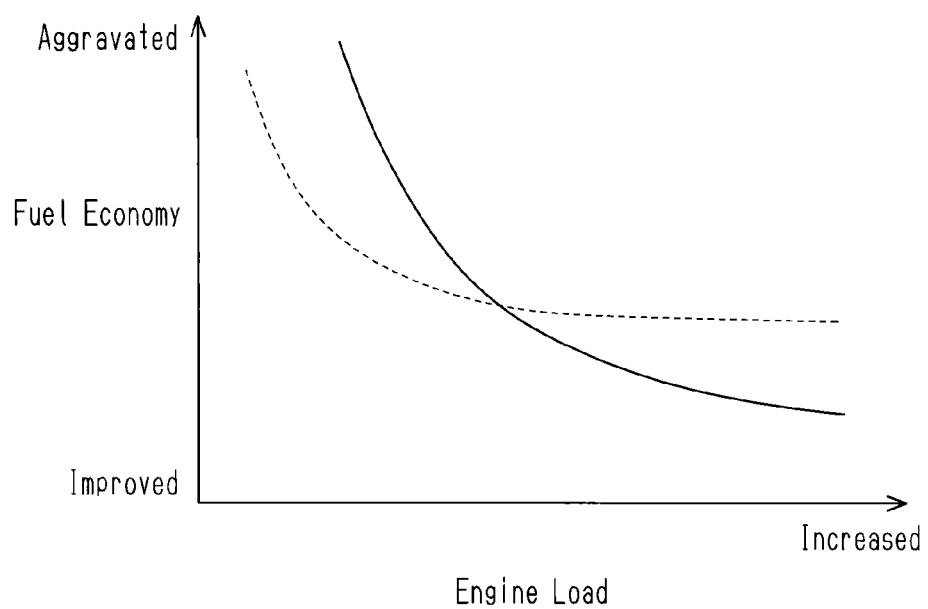
FIG. 4 is a graph representing the difference of the manner in which the fuel economy of the engine changes in relation to change of the engine load between when the fuel injection from the direct injector in the compression stroke is performed and when such fuel injection is not performed.

[1] The fuel injection in the compression stroke is characterized in that air streams in a cylinder are easily collected near an ignition plug and thus achieves desirable ignition of the fuel in the cylinder to increase the fuel combustion speed. FIG. 3 represents the relationship between the fuel injection timing of the direct injector 7 and the fuel combustion period in the cylinder. As is clear from the graph, the combustion speed of the fuel in the cylinder increases and the combustion period of the fuel decreases when the fuel injection timing is set after the time point BDC (the fuel injection timing is set in the compression stroke), compared with when the fuel injection timing is set before the time point BDC (the fuel injection timing is set in the intake stroke). FIG. 4 represents the difference of the manner in which the fuel economy of the engine 1 changes in relation to change of the engine load between when fuel injection from the direct injector 7 in the compression stroke is performed and when such fuel injection is not carried out. In the graph, the solid curve represents the case with the fuel injection from the direct injector 7 in the compression stroke and the broken curve represents the case without such fuel injection. From comparison between these cases, it is clear that, when the operating range of the engine 1 is in a relatively high load range, the fuel injection in the compression stroke increases the combustion speed of the fuel in the cylinder and thus improves the fuel economy of the engine 1.

Figure 5:
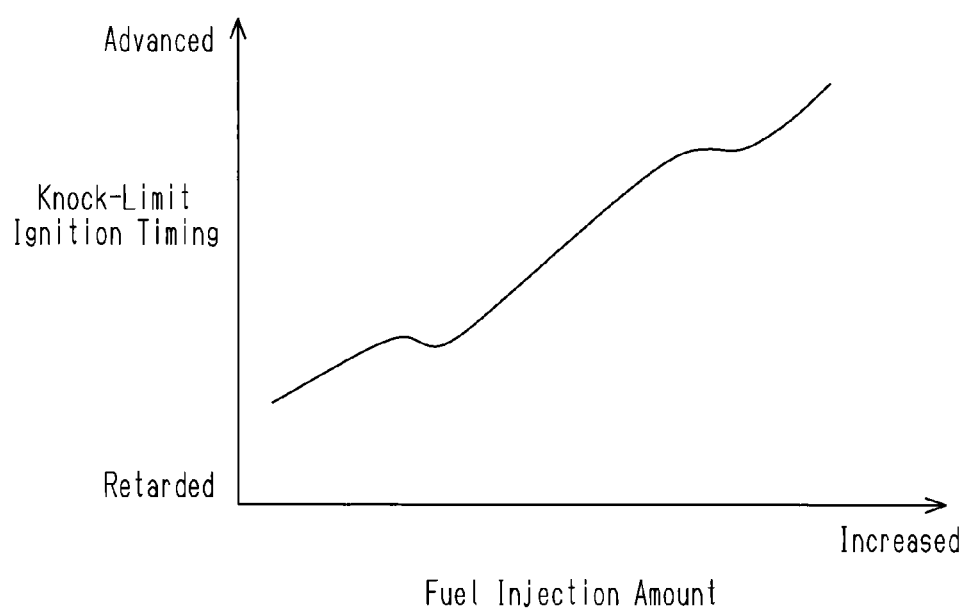
FIG. 5 is a graph representing the relationship between the fuel injection amount of the fuel injection from the direct injector in the early stage of the intake stroke and the ignition timing (the knock limit ignition timing) of the engine at the time when the ignition timing is advanced to such a limit that knocking does not occur.
Figure 6:
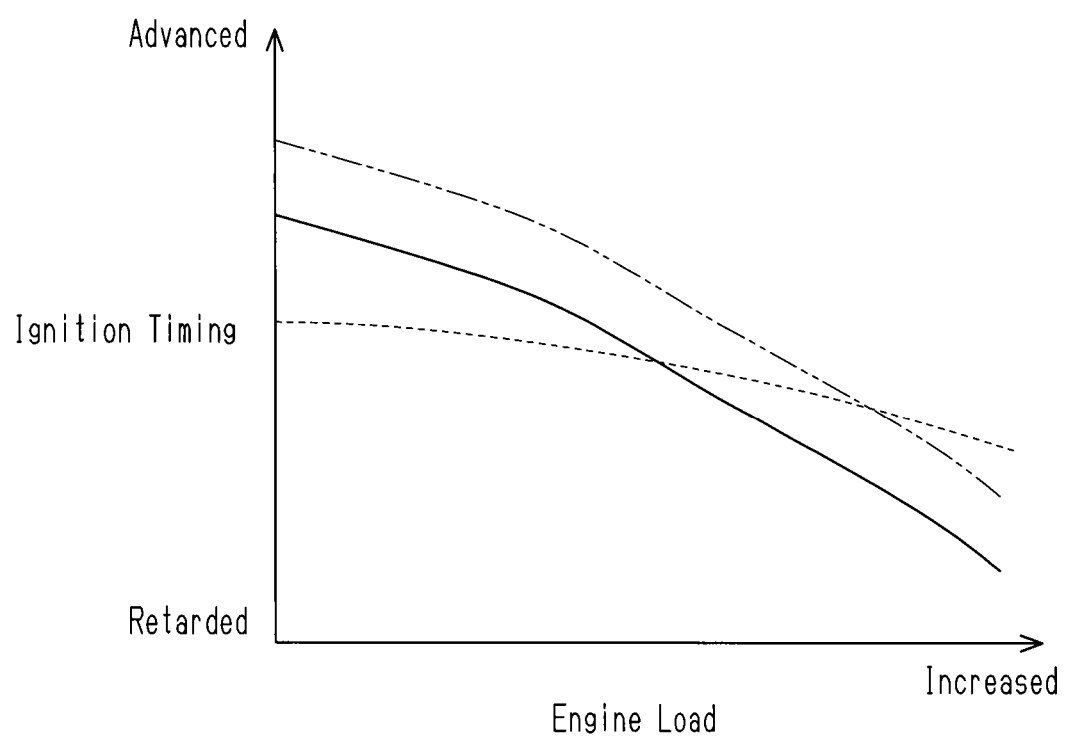
FIG. 6 is a graph representing the difference of the manner in which the knock limit ignition timing changes in relation to change of the engine load between when the fuel injection from the direct injector in the early stage of the intake stroke is performed and when such fuel injection is not performed.

[2] The fuel injection in the early stage of the intake stroke allows the injected fuel to adhere directly onto the top of the piston 13, thus cooling the top of the piston 13 through latent heat of vaporization generated by the fuel and suppressing the occurrence of knocking in the engine 1. FIG. 5 represents the relationship between the fuel injection amount in the fuel injection from the direct injector 7 in the early stage of the intake stroke and the ignition timing at the time when the ignition timing of the engine 1 is advanced maximally to such a limit that knocking does not occur (the knock limit ignition timing). The graph shows that, as the fuel injection amount in the early stage of the intake stroke becomes greater, the top of the piston 13 is cooled with more effectiveness, thus advancing the knock limit ignition timing. FIG. 6 represents the difference of the manner in which the knock limit ignition timing changes in relation to change of the engine load between when the fuel injection from the direct injector 7 in the early stage of the intake stroke is performed and when such fuel injection is not carried out. In the graph, the solid curve represents the knock limit ignition timing in the case with the fuel injection from the direct injector 7 in the early stage of the intake stroke and the double-dotted broken curve represents the knock limit ignition timing in the case without the aforementioned fuel injection. From comparison between these cases, it is clear that the fuel injection in the early stage of the intake stroke advances the knock limit ignition timing. When the engine 1 is in an operating range with comparatively high load, such advancement of the knock limit ignition timing allows the knock limit ignition timing to be a value close to the ignition timing that maximizes the output torque of the engine 1 (MBT). The ignition timing MBT is represented by the broken curve in FIG. 7.

Operation of the fuel injection control device of the first embodiment will hereafter be described.

To inject fuel from the direct injector 7 and the port injector 6 to supply the requested fuel injection amount Qfin of the engine 1, the fuel injection control device drives the direct injector 7 and the port injector 6 in the manner described below. First, the fuel injection control device sets target fuel injection amounts Qd1, Qd3 of the fuel injection from the direct injector 7 in the compression stroke and the early stage of the intake stroke each to a requested value corresponding to the engine operating state. Specifically, of the target fuel injection amounts of fuel injection from the direct injector 7 in the compression stroke and the early stage of the intake stroke, the target fuel injection amount of the fuel injection with a higher priority is set as a requested value corresponding to the engine operating state. Then, the target fuel injection amount of the fuel injection with the lower priority is set as a requested value corresponding to the engine operating state. The fuel injection control device then drives the direct injector 7 based on the set target fuel injection amounts Qd1, Qd3 such that the target fuel injection amounts Qd1, Qd3 are achieved in the respective fuel injection shots.

In this case, the target fuel injection amounts of the fuel injection from the direct injector 7 in the above-described shots are set based on the engine operating state to the values that maximize the advantages of the fuel injection in the respective shots, sequentially in the descending order according to the priority ranking given to the shots in the current engine operating state. The direct injector 7 is then operated to achieve the target fuel injection amounts of the respective shots of fuel injection. This achieves the advantages of the fuel injection in all shots of the fuel injection to a maximum extent to obtain maximum engine performance.

However, there may be a case in which the sum of the target fuel injection amounts Qd1, Qd3 of the fuel injection from the direct injector 7 in the compression stroke and the early stage of the intake stroke falls short of the requested fuel injection amount Qfin. In this case, the fuel of the requested fuel injection amount Qfin cannot be fully injected by the fuel injection from the direct injector 7 in the compression stroke and the early stage of the intake stroke. However, in this case, an amount of fuel that corresponds to a part of the requested fuel injection amount Qfin that cannot be injected by the fuel injection from the direct injector 7 in the respective shots is set as a target fuel injection amount Qp for fuel injection from the port injector 6. The port injector 6 is thus operated based on the set target fuel injection amount Qp to achieve the target fuel injection amount Qp.

Specifically, the fuel injection from the direct injector 7 in the compression stroke increases the fuel combustion speed in the cylinder. However, if the fuel injection amount increases beyond the target fuel injection amount Qd1, such fuel injection may adversely affect the fuel combustion. Further, the fuel injection from the direct injector 7 in the early stage of the intake stroke cools the top of the piston 13 using latent heat of vaporization produced by injected fuel to cool the temperature in the cylinder, thus suppressing the occurrence of knocking. However, if the fuel injection amount increases beyond the target fuel injection amount Qd3, such fuel injection may cause an excessive temperature drop in the cylinder, thus adversely affecting the fuel combustion.

To avoid these problems, an amount of fuel that corresponds to a part of the requested fuel injection amount Qfin that cannot be injected by the fuel injection from the direct injector 7 in the compression stroke and the early stage of the intake stroke is injected by the fuel injection from the port injector 6. This makes it unlikely that the fuel injection amount of the fuel injection in the compression stroke or the early stage of the intake stroke will increase beyond the corresponding target fuel injection amount to supply the requested fuel injection amount Qfin and thus adversely affect the fuel combustion. Also, since the fuel injection amount of the fuel injection in the compression stroke becomes equal to the target fuel injection amount Qd1, the fuel combustion speed in the cylinder is increased through such fuel injection. Additionally, since the fuel injection amount of the fuel injection in the early stage of the intake stroke becomes equal to the target fuel injection amount Qd3, the top of the piston 13 is cooled appropriately such that the occurrence of knocking is suppressed through such cooling.

Figure 7:
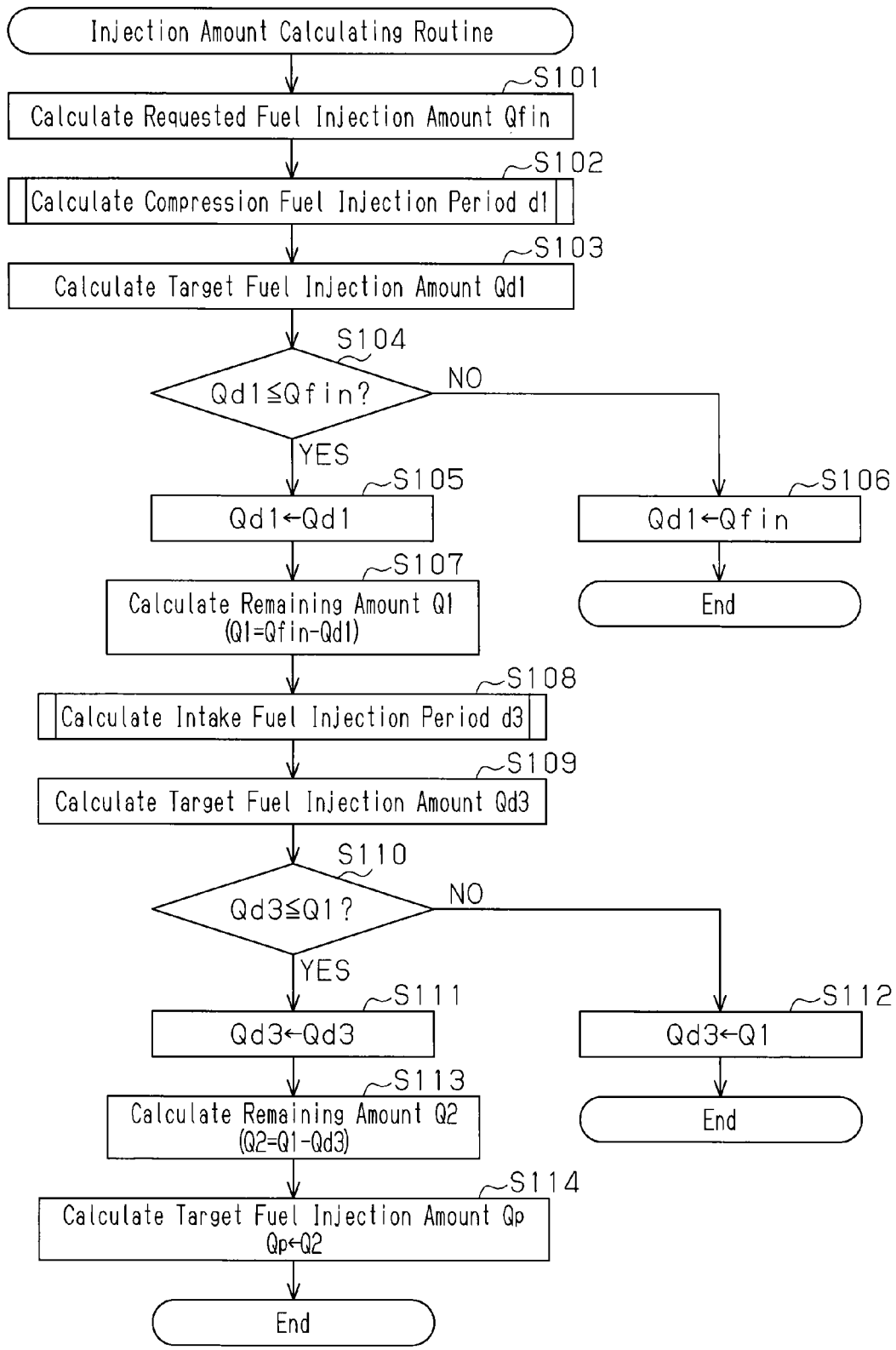
FIG. 7 is a flowchart representing a procedure for setting target fuel injection amounts for respective shots of the fuel injection from the direct cylinder and a target fuel injection amount for fuel injection from a port injector.

The target fuel injection amounts Qd1, Qd3 of the respective fuel injection shots of the direct injector 7 and the target fuel injection amount Qp of the fuel injection from the port injector 6 are calculated in the manner described below, as represented in the flowchart of FIG. 7 representing a fuel injection amount calculating routine. The fuel injection calculating routine is performed by the electronic control unit 16 in an interrupting manner every predetermined crank angle.

The routine is started by determining the requested fuel injection amount Qfin of the engine 1 based on the engine operating state such as the engine speed and the engine load (S101) and then the steps (A), (B) and (C) described below are carried out. (A) A procedure for setting the target fuel injection amount Qd1 of the fuel injection from the direct injector 7 in the compression stroke (S102 to S106). (B) A procedure for setting the target fuel injection amount Qd3 of the fuel injection from the direct injector 7 in the early stage of the intake stroke (S107 to S112). (C) A procedure for setting the target fuel injection amount Qp of the fuel injection from the port injector 6 (S113, S114).

The procedures (A), (B), and (C) are performed sequentially in this order. When performing these procedures, the electronic control unit 16 functions as a setting section for setting the target fuel injection amounts Qd1, Qd3 and Qp. Specifically, in the shots of the fuel injection from the direct injector 7, a fuel injection shot closer to the ignition timing of the engine 1 has a greater influence on fuel ignition depending on variation of the fuel injection amount and is thus given higher priority. Accordingly, the procedures (A) and (B) regarding the fuel injection of the direct injector 7 are performed in the aforementioned order.

The procedures (A) to (C) will hereafter be described in detail.

The procedure (A) is started by calculating a compression fuel injection period d1, which is the period necessary for allowing the fuel injection amount of the direct injector 7 in the compression stroke to become equal to the optimal value for the current engine operating state (the requested value), based on the engine operating state including the engine speed and the engine load and the direct injection pressure (S102). Then, the target fuel injection amount Qd1 is calculated by multiplying the compression fuel injection period d1 by the direct injection pressure (S103). Afterwards, it is determined whether the target fuel injection amount Qd1 is less than or equal to the requested fuel injection amount Qfin (S104). If a positive determination is made, the target fuel injection amount Qd1 determined in Step S103 is maintained (S105). In contrast, if the determination is negative, the target fuel injection amount Qd1 is replaced by the requested fuel injection amount Qfin (S106).

The procedure (B) is started by calculating a remaining amount Q1, which is the value obtained by subtracting the target fuel injection amount Qd1 set in the procedure (A) from the requested fuel injection amount Qfin (S107). Subsequently, an intake fuel injection period d3, which is the period necessary for allowing the fuel injection amount of the direct injector 7 in the early stage of the intake stroke to become equal to the optimal value for the current engine operating state (the requested value), is calculated (S108). Then, the target fuel injection amount Qd3 is calculated by multiplying the intake fuel injection period d3 by the direct injection pressure (S109). Afterwards, it is determined whether the target fuel injection amount Qd3 is less than or equal to the remaining amount Q1 (S110). If a positive determination is made, the target fuel injection amount Qd3 determined in Step S109 is maintained (S111). In contrast, if the determination is negative, the target fuel injection amount Qd3 is replaced by the remaining amount Q1 (S112).

In the procedure (C), a remaining amount Q2, which is the value determined by subtracting the target fuel injection amount Qd3 set in the procedure (B) from the remaining amount Q1, is calculated (S113). The remaining amount Q2 is then set as the target fuel injection amount Qp of the fuel injection from the port injector 6 (S114).

Figure 8:
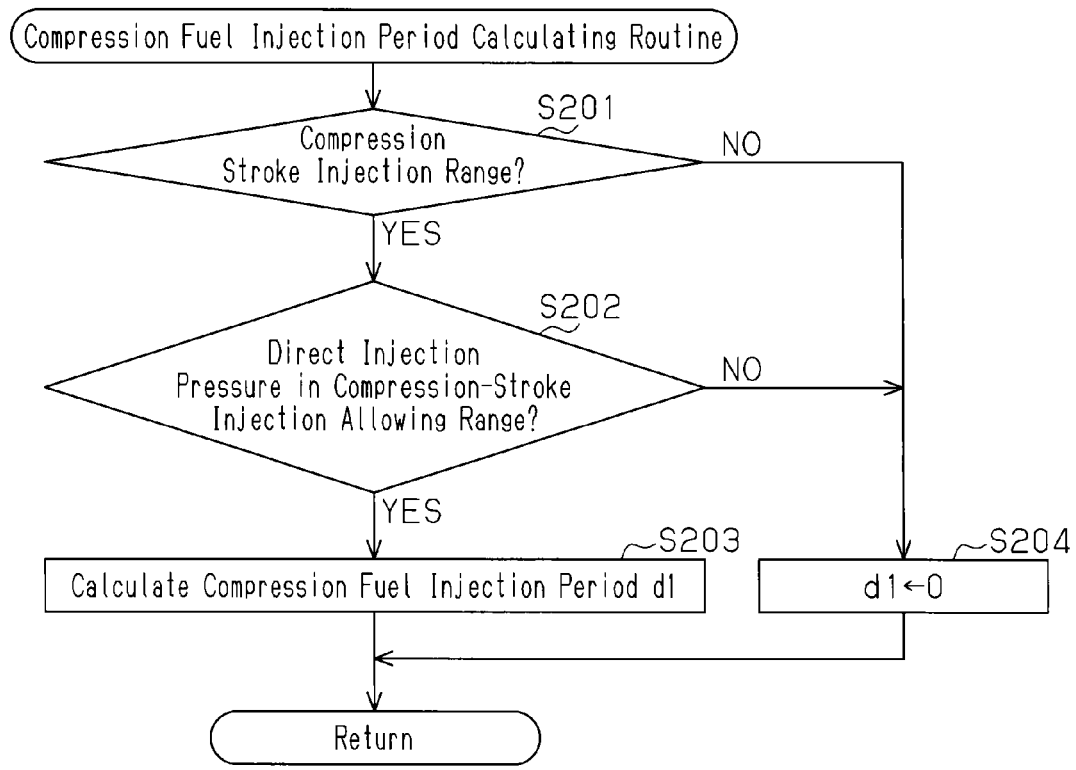
FIG. 8 is a flowchart representing a procedure for calculating a compression fuel injection period.

Calculation of the compression fuel injection period d1 in Step S102 (FIG. 7) according to the injection amount calculating routine will hereafter be described in detail with reference to the flowchart of FIG. 8, which represents a compression fuel injection period calculating routine. The compression fuel injection period calculating routine is carried out by the electronic control unit 16 each time Step S102 is performed.

Figure 9:
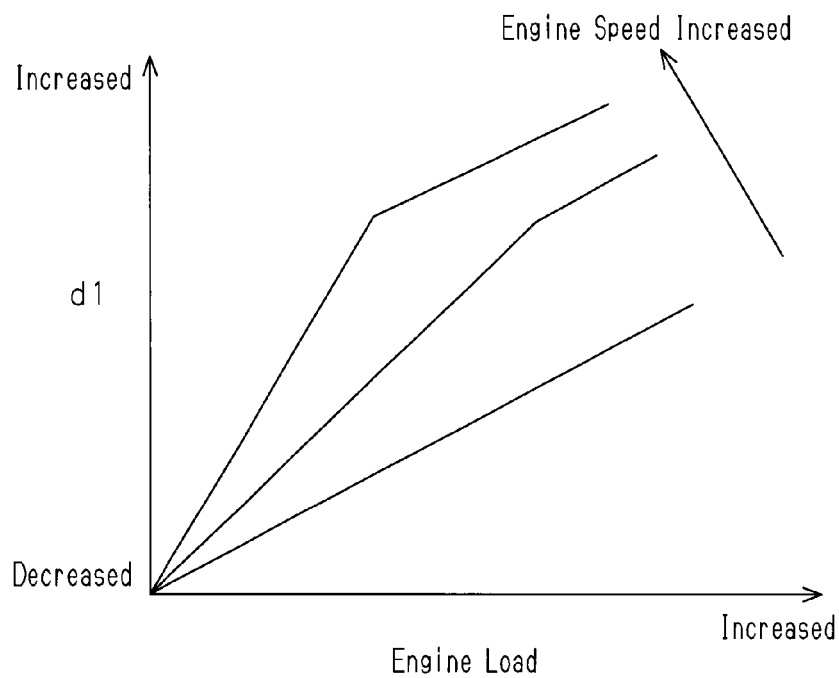
FIG. 9 is a graph representing the manner in which the compression fuel injection period changes in relation to change of the engine speed and change of the engine load.

In the first fuel injection amount calculating routine, it is determined whether the current engine operating state including the engine speed and the engine load is in a range where the fuel injection from the direct injector 7 in the compression stroke should be performed (S201). It is also determined whether the direct injection pressure is in a range where the aforementioned fuel injection in the compression stroke can be carried out (S202). If positive determinations are made in both Step S201 and Step S202, the compression fuel injection period d1 is calculated as a function of the engine speed and the engine load with reference to a map (S203). The thus determined compression fuel injection period d1 is set to a greater value as the engine load becomes greater and the engine speed becomes higher, as represented in FIG. 9, for example, such that the injected fuel corresponds to a value such that an easily ignited air-fuel mixture (less rich air-fuel mixture) can be formed near the spark plug in the cylinder. The compression fuel injection period d1 is guarded not to increase beyond its maximum value. In contrast, if a negative determination is made in either Step S201 or Step S202, the compression fuel injection period dl is set to 0 to prevent the fuel injection in the compression stroke (S204).

Calculation of the intake fuel injection period d3 in Step S108 (FIG. 7) according to the injection amount calculating routine will hereafter be described in detail with reference to the flowcharts of FIGS. 10 and 11, which represent an intake fuel injection period calculating routine. The intake fuel injection period calculating routine is carried out by the electronic control unit 16 each time Step S108 is performed.

In the third fuel injection period calculating routine, it is determined whether the fuel injection from the direct injector 7 in the compression stroke is carried out, that is, for example, whether the compression fuel injection period d1 is greater than 0 (S401). If a positive determination is made in Step S401, a procedure for calculating the intake fuel injection period d3 for the case where the fuel injection in the compression stroke is performed (S402 to S408) is carried out.

In this procedure, the intake fuel injection period d3 is calculated based on MBT, a final ignition timing E, a final ignition timing I, and a maximum value a using the expression (1): $d3=\alpha \cdot (MBT-E)/(I-E)$. In the expression (1), the MBT represents the ignition timing that maximizes the output torque of the engine 1 for the case where the fuel injection from the direct injector 7 in the compression stroke is performed. The final ignition timing E is the optimal ignition timing of the engine 1 in the case where the fuel injection from the direct injector 7 in the compression stroke is performed and the fuel injection from the direct injector 7 in the early stage of the intake stroke is not carried out. The final ignition timing I is the optimal ignition timing of the engine 1 for the case where the fuel injection in the compression stroke is performed and the fuel injection in the early stage of the intake stroke is carried out to a maximum extent to suppress the occurrence of knocking in the engine 1. The final ignition timings I, E change as the engine load changes as represented in, for example, FIG. 12(*a*). The maximum value α is the fuel injection period for the case where the fuel injection in the compression stroke is performed and the fuel injection in the early stage of the intake stroke is carried out to a maximum extent.

Figure 10:
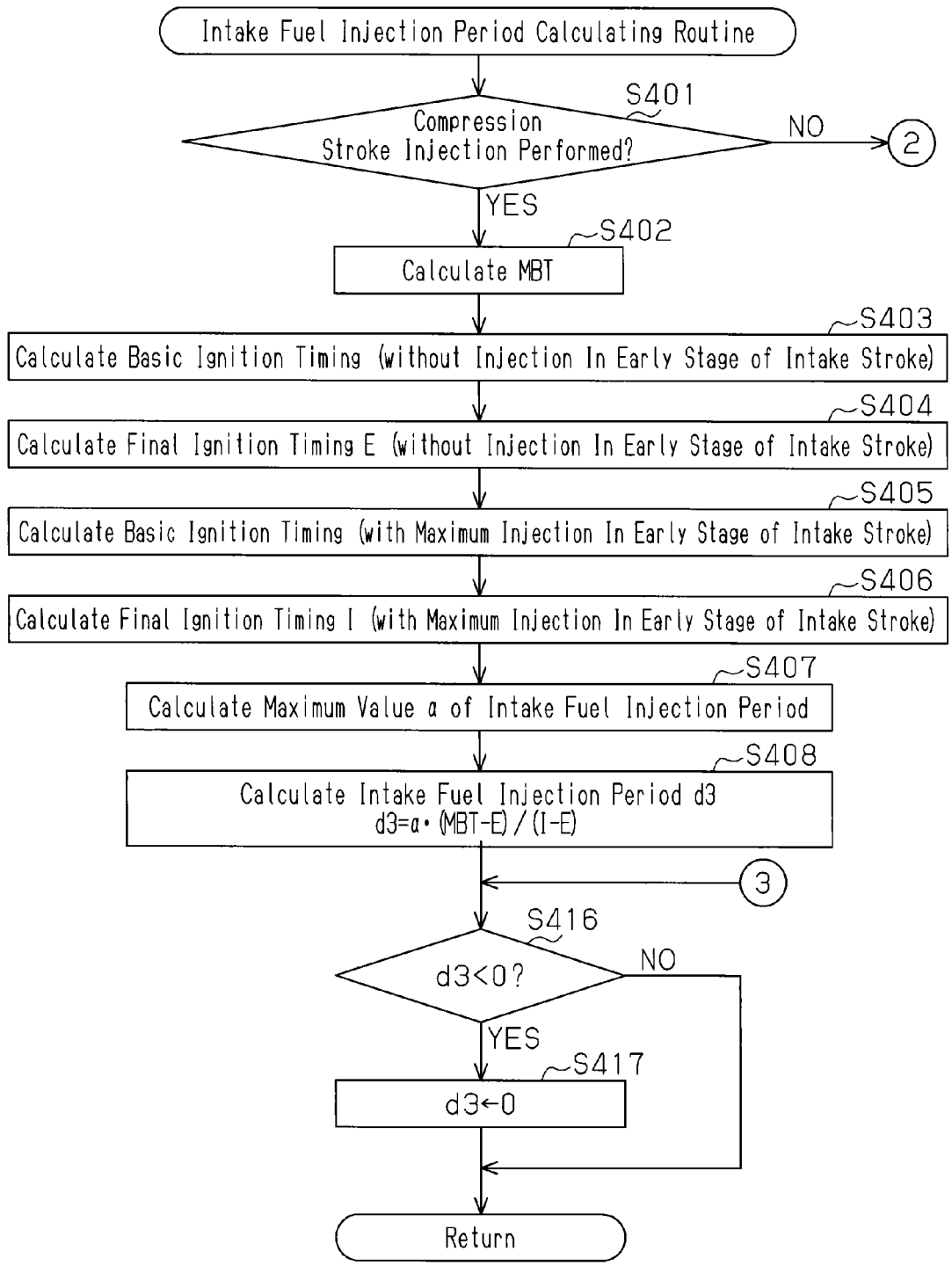
FIG. 10 is a flowchart representing a procedure for calculating an intake fuel injection period.

Steps S402 to S408 of FIG. 10 will hereafter be described in detail. The procedure of these steps is started by calculating the MBT in the case where the fuel injection in the compression stroke is performed in correspondence with the engine speed and the engine load (S402). Then, a basic ignition timing, which is a reference ignition timing of the engine 1 in the case where the fuel injection in the compression stroke is carried out and the fuel injection from the direct injector 7 in the early stage of the intake stroke is not performed, is calculated in correspondence with the engine operating state including the engine speed and the engine load (S403). The basic ignition timing is then subjected to different types of correction including correction based on whether knocking occurs in the engine 1 (KCS correction), correction based on the coolant temperature of the engine 1, and correction based on the valve timing of the intake valve 26 to obtain the final ignition timing E (S404). Also, another basic ignition timing, which is a reference ignition timing of the engine 1 for the case where the fuel injection in the compression stroke is performed and the fuel injection from the direct injector 7 in the early stage of the intake stroke is carried out to a maximum extent to advance the knock limit of the engine 1, is calculated in correspondence with the engine operating state including the engine speed and the engine load (S405). The thus obtained basic ignition timing is subjected to different types of correction including the KCS correction, the correction based on the coolant temperature of the engine 1, and the correction based on the valve timing of the intake valve 26 to determine the final ignition timing I (S406). After the final ignition timing E and the final ignition timing I are obtained in the above-described manners, the maximum value α is calculated based on the engine operating state including the engine speed and the engine load (S407). Then, the intake fuel injection period d3 for the case where the fuel injection in the compression stroke is carried out is calculated based on the MBT, the final ignition timing E, the final ignition timing I, and the maximum value α, using the expression (1) (S408).

In contrast, if it is determined that the fuel injection from the direct injector 7 in the compression stroke is not carried out in Step S401, a procedure for calculating the intake fuel injection period d3 for the case where the fuel injection in the compression stroke is not performed (Steps S409 to S414 of FIG. 11) is executed.

In this procedure, the intake fuel injection period d3 is calculated based on the MBT, a final ignition timing F, a final ignition timing J, and a maximum value β using the expression (2): $d3 = \beta \cdot (MBT-F)/(J-F)$. In the expression (2), the MBT represents the ignition timing that maximizes the output torque of the engine 1 for the case where the fuel injection in the compression stroke is not performed. The final ignition timing F is the optimal ignition timing of the engine 1 for the case where the fuel injection in the compression stroke is not performed and the fuel injection from the direct injector 7 in the early stage of the intake stroke is not carried out. The final ignition timing J is the optimal ignition timing of the engine 1 for the case where the fuel injection in the compression stroke is not performed and the fuel injection in the early stage of the intake stroke is carried out to a maximum extent to suppress the occurrence of knocking in the engine 1. The final ignition timings F, J change as the engine load changes as represented in, for example, FIG. 12(*a*). The maximum value β is the fuel injection period for the case where the fuel injection in the compression stroke is not performed and the fuel injection in the early stage of the intake stroke is carried out to a maximum extent.

Figure 11:
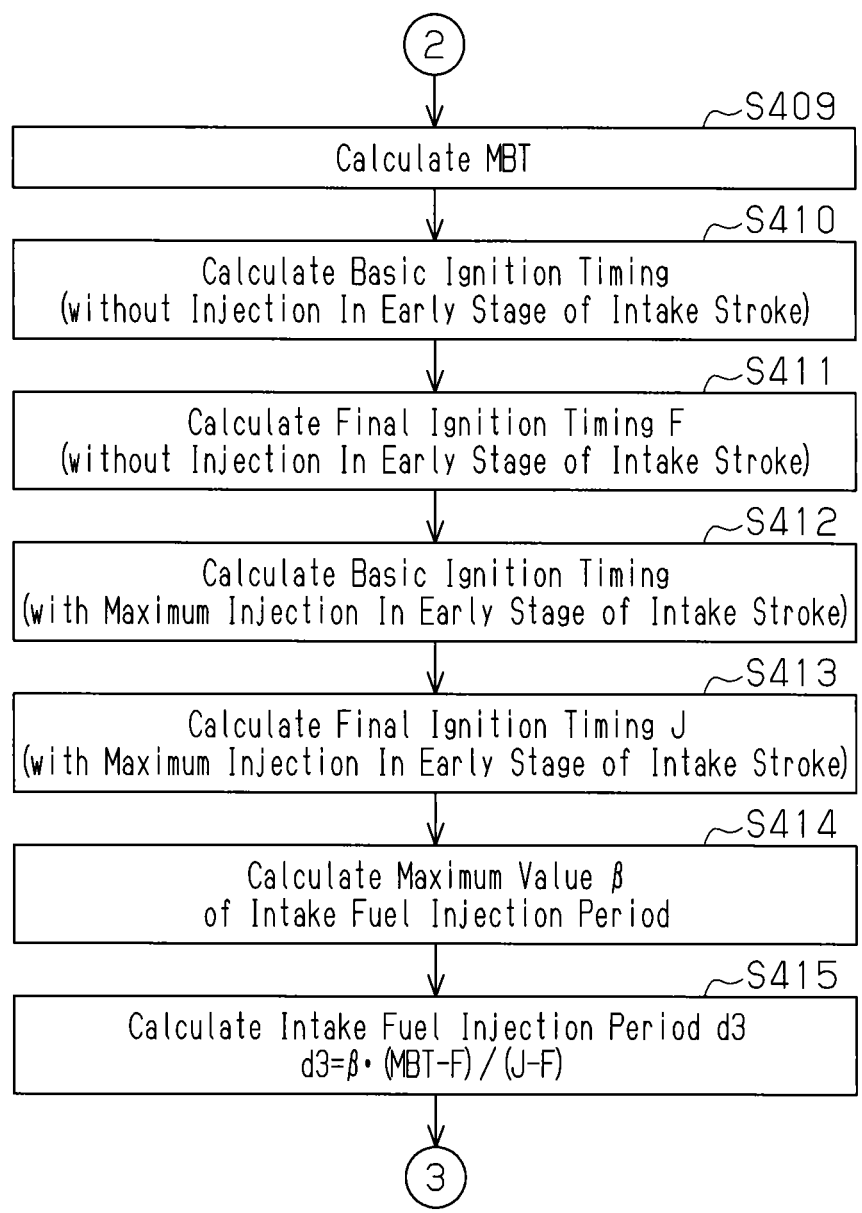
FIG. 11 is another flowchart representing the procedure for calculating an intake fuel injection period.

Steps S409 to S414 of FIG. 11 will hereafter be described in detail. The procedure of these steps is started by calculating the MBT for the case where the fuel injection in the compression stroke is not performed based on the engine speed and the engine load (S409). Then, a basic ignition timing, which is a reference ignition timing of the engine 1 for the case where the fuel injection in the compression stroke is not carried out and the fuel injection from the direct injector 7 in the early stage of the intake stroke is not performed, is calculated based on the engine operating state including the engine speed and the engine load (S410). The basic ignition timing is then subjected to different types of correction including the correction based on whether knocking occurs in the engine 1 (the KCS correction), the correction based on the coolant temperature of the engine 1, and the correction based on the valve timing of the intake valve 26 to obtain the final ignition timing F (S411). Also, another basic ignition timing, which is a reference ignition timing of the engine 1 for the case where the fuel injection in the compression stroke is not performed and the fuel injection from the direct injector 7 in the early stage of the intake stroke is carried out to a maximum extent to advance the knock limit of the engine 1, is calculated based on the engine operating state including the engine speed and the engine load (S412). The thus obtained basic ignition timing is subjected to different types of correction including the KCS correction, the correction based on the coolant temperature of the engine 1, and the correction based on the valve timing of the intake valve 26 to determine the final ignition timing J (S406). After the final ignition timing F and the final ignition timing J are obtained in the above-described manners, the maximum value β is calculated based on engine operating state including the engine speed and the engine load (S414). Then, the intake fuel injection period d3 for the case where the fuel injection in the compression stroke is not carried out is calculated based on the MBT, the final ignition timing F, the final ignition timing J, and the maximum value β, using the expression (2) (S415).

Figure 12:
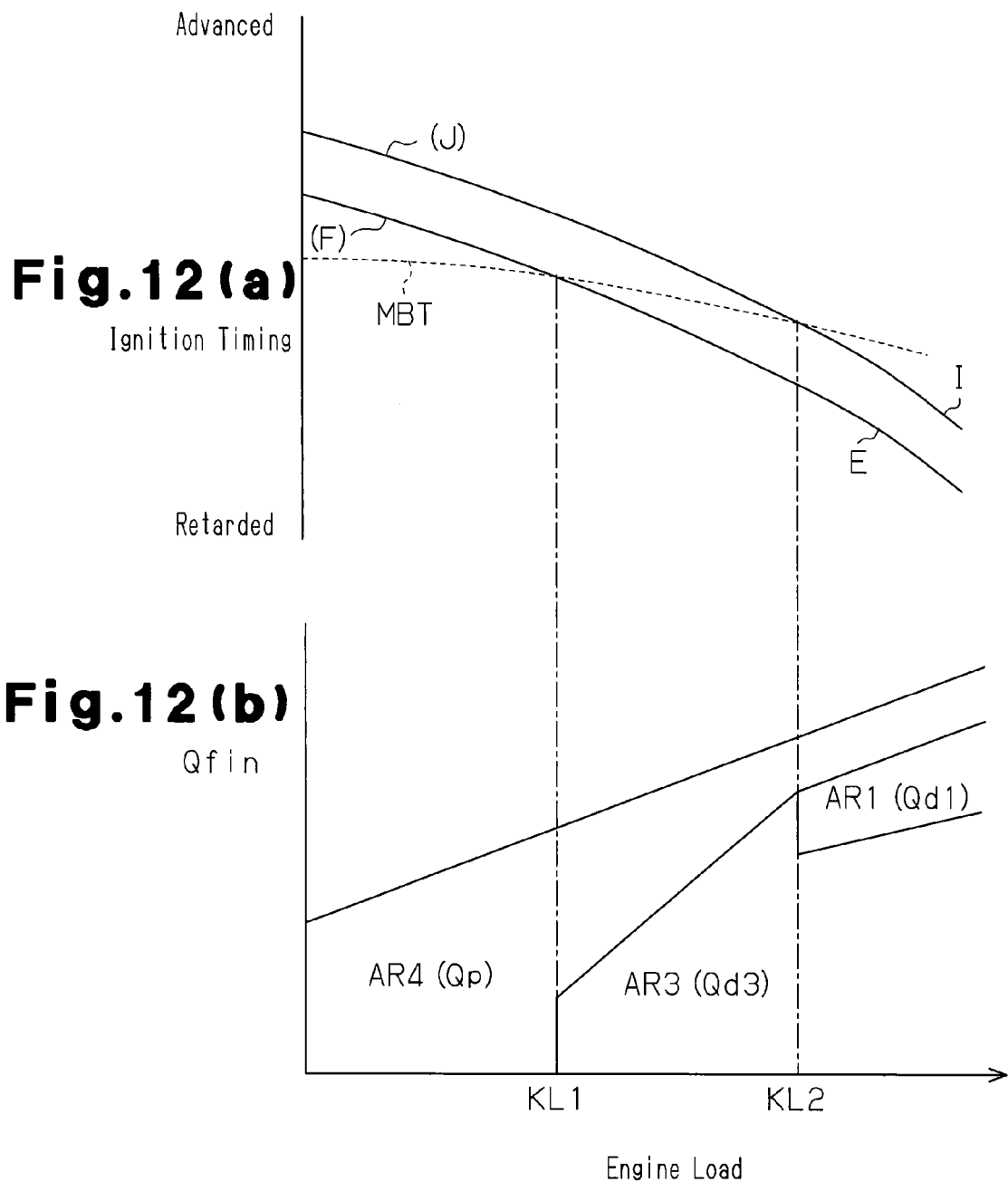
FIG. 12(a) is a graph representing the manners in which final ignition timings E, F, I, and J and MBT change in relation to change of the engine load.
FIG. 12(b) is a graph representing change of the manner in which the engine 1 performs fuel injection.

After the intake fuel injection period d3 is calculated in Step S408 (FIG. 10) or S415 (FIG. 11), the intake fuel injection period d3 is guarded not to exceed its maximum value. Then, it is determined whether the intake fuel injection period d3 is less than 0 (S416 in FIG. 11). If a positive determination is made, the intake fuel injection period d3 is set to 0 (S417). Specifically, in this case, when the final ignition timing F is advanced with respect to (greater than) the MBT in the low-load operating range of the engine 1 as represented in FIG. 12(*a*), the intake fuel injection period d3 calculated using the expression (2) is set to a value less than 0. In this case, the intake fuel injection period d3 is set to 0 through Steps S416 and S417.

An example of how the fuel injection of the engine 1 changes in relation to change of the engine load will now be described with reference to FIG. 12.

In FIG. 12(b), the fuel injection from the direct injector 7 in the compression stroke is performed in the range AR1 and the fuel injection from the direct injector 7 in the early stage of the intake stroke is carried out in the range AR3. Further, the fuel injection from the port injector 6 is carried out in the range AR4. As shown in the drawing, the range AR3 is in the range of the engine load greater than a predetermined value KL1, which is the load range in which the final ignition timing F (FIG. 12(a)) is retarded with respect to (less than) the MBT. The range AR1 is in the range of the engine load greater than a predetermined value KL2, which is the load range in which the final ignition timings E, I (FIG. 12(a)) are both retarded with respect to (less than) the MBT.

When the engine load is the minimum, the fuel injection from the port injector 6 by the target fuel injection amount Qp is performed to supply the requested fuel injection amount Qfin. Then, after the engine load exceeds the predetermined value KL1, the fuel injection in the early stage of the intake stroke by the target fuel injection amount Qd3 and the fuel injection from the port injector 6 by the target fuel injection amount Qp are performed, such that the requested fuel injection amount Qfin is achieved. Further, after the engine load exceeds the predetermined value KL2, the fuel injection from the direct injector 7 in the compression stroke by the target fuel injection amount Qd1, the fuel injection in the early stage of the intake stroke by the target fuel injection amount Qd3, and the fuel injection from the port injector 6 by the target fuel injection amount Qp are performed. As a result, the requested fuel injection amount Qfin is achieved.

As represented in FIG. 12(b), in this example, the target fuel injection amount Qd3 of the fuel injection from the direct injector 7 in the early stage of the intake stroke is set to a greater value as the engine load becomes greater in the range from the values KL1 to KL2. Accordingly, even though the increased engine load raises the temperature in the cylinder and may easily induce knocking, the target fuel injection amount Qd3 increases correspondingly to the increased engine load and thus allows the fuel injection in the early stage of the intake stroke by the target fuel injection amount Qd3 to cool the top of the piston 13 effectively. This suppresses the temperature rise in the cylinder and thus reduces the possibility of knocking, thus allowing advancement of the ignition timing of the engine 1 toward the MBT. The output torque of the engine 1 is thus increased through such ignition timing advancement.

Figure 13:
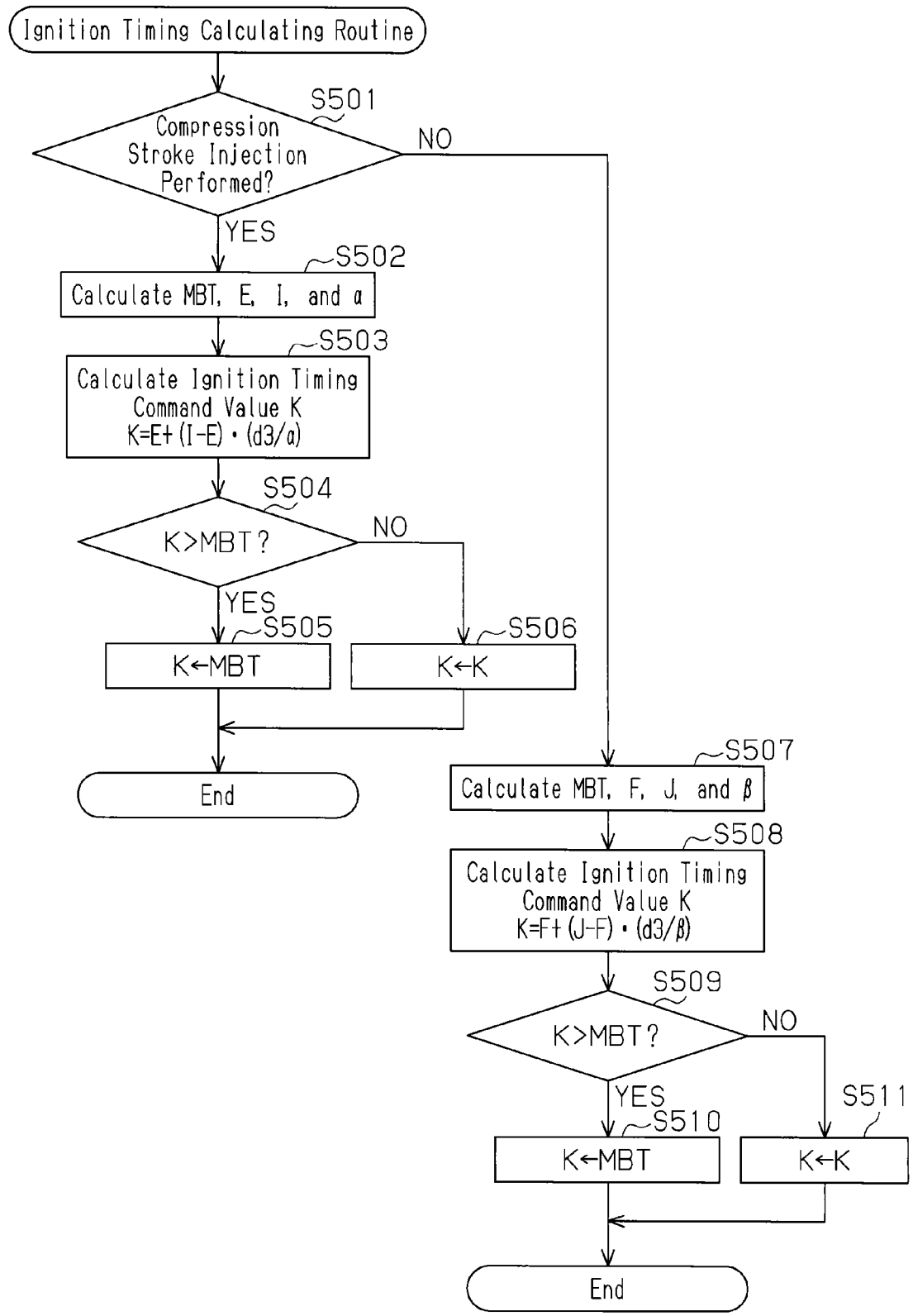
FIG. 13 is a flowchart representing a procedure for calculating an ignition timing command value.

Calculation of an ignition timing command value K, which is used in ignition timing control of the engine 1, will now be described with reference to the flowchart of FIG. 13, which represents an ignition timing calculating routine. The ignition timing calculating routine is carried out by the electronic control unit 16 in an interrupting manner every predetermined crank angle, for example.

The ignition timing calculating routine is started by determining whether the fuel injection from the direct injector 7 in the compression stroke is carried out (S501). If a positive determination is made in Step S501, a procedure for calculating the ignition timing command value K for the case where the fuel injection in the compression stroke is performed (Steps S502 to S506) is carried out.

In this procedure, the MBT, the final ignition timing E, the final ignition timing I, and the maximum value α are calculated (S502), as in Steps S402, S404, S406, and S407 of the intake fuel injection period calculating routine (FIG. 10). Using the obtained final ignition timing E, final ignition timing I, and maximum value α and the intake fuel injection period d3 calculated in Step S408 of the intake fuel injection period calculating routine, the ignition timing command value K for the case where the fuel injection in the compression stroke is performed is calculated using the expression (3): $K=E+(I-E)\cdot(d3/\alpha)$ (S503). Then, it is determined whether the obtained ignition timing command value K is advanced with respect to (greater than) the MBT (S504). If a positive determination is made, the ignition timing command value K is replaced by the MBT (S505). If a negative determination is made, the ignition timing command value K is maintained (S506).

In contrast, if it is determined that the fuel injection from the direct injector 7 in the compression stroke is not carried out in Step S501, a procedure for calculating an ignition timing command value K for the case where the fuel injection in the compression stroke is not performed (Steps S507 to S511) is carried out.

In this procedure, the MBT, the final ignition timing F, the final ignition timing J, and the maximum value β are calculated (S507), as in Steps S409, S411, S413, and S414 of the intake fuel injection period calculating routine (FIG. 11). Using the obtained final ignition timing F, final ignition timing J, and maximum value β and the intake fuel injection period d3 calculated in Step S415 of the intake fuel injection period calculating routine, the ignition timing command value K for the case where the fuel injection in the compression stroke is not performed is calculated using the expression (4): $K=F+(J-F)\cdot(d3/\beta)$ (S508). Then, it is determined whether the obtained ignition timing command value K is advanced with respect to (greater than) the MBT (S509). When a positive determination is made in Step S509, the ignition timing command value K is replaced by the MBT (S510). If the determination in Step S509 is negative, the ignition timing command value K is maintained (S511).

After the ignition timing command value K is calculated in the above-described manner, the ignition timing of the engine 1 is controlled based on the ignition timing command value K. By controlling the ignition timing of the engine 1 in this manner, the ignition timing of the engine 1 is controlled to a value closest possible to the MBT, which is represented by the broken curve in FIG. 12(a), in a range where knocking does not occur. If the ignition timing is retarded with respect to the value corresponding to the MBT, the ignition timing is brought maximally close to the MBT in a range where knocking does not occur.

The above described embodiment has the following advantages.

(1) When the direct injector 7 and the port injector 6 inject fuel such that the requested fuel injection amount Qfin of the engine 1 is achieved, the direct injector 7 is operated in the manner described below. That is, of the target fuel injection amounts of fuel injection from the direct injector 7 in the compression stroke and the early stage of the intake stroke, the target fuel injection amount of the fuel injection with a higher priority is set as a requested value corresponding to the engine operating state. Then, the target fuel injection amount of the fuel injection with the lower priority is set as a requested value corresponding to the engine operating state. The direct injector 7 is then operated to achieve the target fuel injection amounts in the respective fuel injection shots. In this case, the target fuel injection amounts of the fuel injection from the direct injector 7 in the above-described shots are set based on the engine operating state to the values (the requested values) that maximize the advantages of the fuel injection in the respective shots, sequentially in the descending order according to the priority ranking given to the shots in the current engine operating state. Accordingly, by operating the direct injector 7 to achieve the thus set target fuel injection amounts Qd1, Qd3 in the respective fuel injection shots, the advantages of the fuel injection shots are obtained altogether to a maximum extent and thus engine operation with its maximum performance is achieved.

(2) When the sum of the target fuel injection amounts Qd2, Qd3 is short of the requested fuel injection amount Qfin, an amount of fuel that corresponds to the shortage is set as the target fuel injection amount Qp of the fuel injection from the port injector 6. The port injector 6 is then actuated based on the target fuel injection amount Qp to achieve the target fuel injection amount Qp. The port injector 6 thus injects an amount of fuel that corresponds to a part of the requested fuel injection amount Qfin that cannot be injected by the fuel injection in the compression stroke and the early stage of the intake stroke. This makes it unlikely that the fuel injection amount of the fuel injection in the compression stroke or the early stage of the intake stroke will increase beyond the corresponding target fuel injection amount to supply the requested fuel injection amount Qfin and thus adversely affect the fuel combustion. Also, since the fuel injection amount of the fuel injection in the compression stroke becomes equal to the target fuel injection amount Qd1, the fuel combustion speed in the cylinder is increased through such fuel injection. Additionally, since the fuel injection amount of the fuel injection in the early stage of the intake stroke becomes equal to the target fuel injection amount Qd3, the top of the piston 13 is cooled appropriately such that the occurrence of knocking is suppressed through such cooling.

(3) The target fuel injection amount Qd3 of the fuel injection from the direct injector 7 in the early stage of the intake stroke is set to a greater value as the engine load becomes greater in the range from the predetermined value KL1 to the predetermined value KL2. Accordingly, even though the increased engine load raises the temperature in the cylinder and may easily induce knocking, the target fuel injection amount Qd3 increases correspondingly to the increased engine load and thus allows the fuel injection in the early stage of the intake stroke by the target fuel injection amount Qd3 to cool the top of the piston 13 effectively. This suppresses the temperature rise in the cylinder and thus reduces the possibility of knocking, thus allowing advancement of the ignition timing of the engine 1 toward the MBT. The output torque of the engine 1 is thus increased through such ignition timing advancement.

The above described embodiment may be modified as follows.

The priority ranking given to the fuel injection shots of the direct injector 7 may be modified as needed in correspondence with, for example, the operating state of the engine 1.

The present invention may be used in an internal combustion engine without a port injector 6. In this case, of the settings of the fuel injections from the direct injector 7, that is, of the settings of the target fuel injection amounts Qd1, Qd3 in the fuel injection in the compression stroke and the early stage of the intake stroke, the setting of the target fuel injection amount Qd3 in the fuel injection in the early stage is performed after completion of the setting of the target fuel injection amount Qd1 of the fuel injection in the compression stroke. In this modification, if the sum of the target fuel injection amounts Qd1, Qd3 is short of the requested fuel injection amount Qfin, it is preferable an amount of fuel that corresponds to the shortage be injected by the direct injector 7 through the fuel injection in the early stage of the intake stroke. As a result, an amount of fuel that corresponds to a part of the requested fuel injection amount Qfin that cannot be injected by the fuel injection from the direct injector 7 in the compression stroke is injected by the fuel injection from the direct injector 7 in the early stage of the intake stroke.

Such fuel injection from the direct injector 7 makes it unlikely that the fuel injection amount of the fuel injection in the compression stroke will increase beyond the target fuel injection amount Qd1 to supply the requested fuel injection amount Qfin and thus adversely affect the fuel combustion. Also, since the fuel injection amount of the fuel injection in the compression stroke becomes equal to the target fuel injection amount Qd1, the fuel combustion speed in the cylinder is increased through such fuel injection.

The fuel injection from the direct injector 7 of this modification may be employed in the engine 1 including the direct injector 7 and the port injector 6, as in the case of the above illustrated embodiment.

DESCRIPTION OF THE REFERENCE NUMERALS

1 . . . internal combustion engine, 2 . . . intake passage, 2a . . . intake port, 3 . . . combustion chamber, 4 . . . throttle valve, 5 . . . accelerator pedal, 6 . . . port injector, 7 . . . direct injector, 8 . . . fuel tank, 9 . . . feed pump, 10 . . . high-pressure fuel pump, 12 . . . spark plug, 13 . . . piston, 14 . . . crankshaft, 15 . . . exhaust passage, 16 . . . electronic control unit, 17 . . . accelerator position sensor, 18 . . . throttle position sensor, 19 . . . air flow meter, 20 . . . crank position sensor, 21 . . . cam position sensor, 22 . . . coolant temperature sensor, 23 . . . first pressure sensor, 24 . . . second pressure sensor, 25 . . . intake camshaft, 26 . . . intake valve, 27 . . . exhaust camshaft, 28 . . . exhaust valve, 29 . . . variable valve timing mechanism, 30 . . . knock sensor, 31 . . . low-pressure fuel pipe, 32 . . . pressure regulator, 33 . . . high-pressure fuel pipe

The invention claimed is:

1. A fuel injection control device for an internal combustion engine having a direct injector that is operated to inject fuel into a cylinder of the engine in a compression stroke and an intake stroke of the engine, the fuel injection control device performing fuel injection from the direct injector to supply a requested fuel injection amount determined based on an engine operating state, the fuel injection control device comprising:

an electronic control unit that is programmed to set a target fuel injection amount of the fuel injection from the direct injector in the compression stroke to a requested value corresponding to the engine operating state, when the requested fuel injection amount is less than or equal to the target fuel injection amount, operate the direct injector to inject the requested fuel injection amount of fuel in the compression stroke, and when the requested fuel injection amount is greater than the target fuel injection amount, operate the direct injector to inject, in the intake stroke, an amount of fuel that is obtained by subtracting the target fuel injection amount from the requested fuel injection amount and operate the direct injector to inject the target fuel injection amount of fuel in the compression stroke.

2. A fuel injection control device for an internal combustion engine having a direct injector that is operated to inject fuel into a cylinder of the engine in a compression stroke and an intake stroke of the engine and a port injector that is operated to inject fuel into an intake port of the engine, the fuel injection control device performing fuel injection from the direct injector and the port injector to supply a requested fuel injection amount determined based on an engine operating state, the fuel injection control device comprising:
- an electronic control unit that is programmed to
  - set first and second target fuel injection amounts of the fuel injection from the direct injector in the intake stroke and the compression stroke to requested values corresponding to the engine operating state, respectively, wherein one of the fuel injection in the intake stroke and the fuel injection in the compression stroke is given a higher priority and the other is given a lower priority,
  - when the requested fuel injection amount is less than or equal to the target fuel injection amount of the fuel injection with the higher priority, operate the direct injector to inject the requested fuel injection amount by the fuel injection with the higher priority,
  - when the requested fuel injection amount is greater than the target fuel injection amount of the fuel injection with the higher priority and is less than or equal to the total value of the first and second target fuel injection amounts, operate the direct injector to perform the fuel injection with the higher priority by the corresponding target fuel injection amount and operate the direct injector to perform the fuel injection with the lower priority by an amount of fuel that is obtained by subtracting the target fuel injection amount of the fuel injection with the higher priority from the requested fuel injection amount, and
  - when the requested fuel injection amount is greater than the total value of the first and second target fuel injection amounts, operate the port injector to inject an amount of fuel that is obtained by subtracting the total value of the first and second target fuel injection amounts from the requested fuel injection amount, operate the direct injector to inject the first target fuel injection amount of fuel in the intake stroke, and operate the direct injector to inject the second target fuel injection amount of fuel in the compression stroke.

3. The fuel injection control device according to claim 2, wherein the electronic control unit is programmed to increase the first target fuel injection amount as an engine load increases.

4. A fuel injection control device for an internal combustion engine having a direct injector that is operated to inject fuel into a cylinder of the engine in a compression stroke and an intake stroke of the engine, the fuel injection control device performing fuel injection from the direct injector to supply a requested fuel injection amount determined based on an engine operating state, the control fuel injection device comprising:
- an electronic control unit that is programmed to
  - give a higher priority to one of the fuel injection in the intake stroke and the fuel injection in the compression stroke and give a lower priority to the other,
  - set a target fuel injection amount of the fuel injection with the higher priority to a requested value corresponding to the engine operating state
  - when the requested fuel injection amount is less than or equal to the target fuel injection amount of the fuel injection with the higher priority, operate the direct injector to inject the requested fuel injection amount by the fuel injection with the higher priority, and
  - when the requested fuel injection amount is greater than the target fuel injection amount of the fuel injection with the higher priority, operate the direct injector to perform the fuel injection with the higher priority by the corresponding target fuel injection amount and operate the direct injector to perform the fuel injection with the lower priority by an amount of fuel that is obtained by subtracting the target fuel injection amount of the fuel injection with the higher priority from the requested fuel injection amount.

5. The fuel injection control device according to claim 4, wherein the electronic control unit is programmed to increase the target fuel injection amount as an engine load increases.

6. The fuel injection control device according to claim 4, wherein the electronic control unit is programmed to give the fuel injection in the intake stroke the higher priority and give the fuel injection in the compression stroke the lower priority.

* * * * *